United States Patent [19]

Starostin et al.

[11] Patent Number: 4,499,364

[45] Date of Patent: Feb. 12, 1985

[54] RESISTANCE WELDING APPARATUS FOR JOINING PIPES END TO END

[76] Inventors: Alexandr M. Starostin, ulitsa Lenina, 19, kv. 62; Alexei M. Malakhov, ulitsa Pushkina, 95, kv. 5; Tamara A. Chertilina, ulitsa Pushkina, 130, kv. 31; Vladislav I. Ponomar, ulitsa Kirova, 2, kv. 42; Nikolai I. Postolaty, ulitsa K. Marxa, 68-a, kv. 45, all of Kakhovka, Khersonskaya oblast; Sergei I. Kuchuk-Yatsenko, ulitsa Filatova, 1/22, kv. 47, Kiev; Filipp I. Peretrukhin, ulitsa Lenina, 20, kv. 3; Anatoly D. Gluschenko, ulitsa Kirova, 19, kv. 10, both of Kakhovka, Khersonskaya oblast; Sergei A. Solodovnikov, ulitsa Solomenskaya, 41, kv. 50, Kiev; Jury G. Shvets, Lesnoi gorodok, ulitsa P. Morozova, 11; Orest M. Serafin, ulitsa Dirizhabelnaya, 28, korpus 1, kv. 45, both of Moskovskaya oblast, all of U.S.S.R.

[21] Appl. No.: 440,221

[22] PCT Filed: Mar. 2, 1981

[86] PCT No.: PCT/SU81/00021

§ 371 Date: Nov. 2, 1982

§ 102(e) Date: Nov. 2, 1982

[87] PCT Pub. No.: WO82/03034

PCT Pub. Date: Sep. 16, 1982

[51] Int. Cl.³ .............................................. B23K 11/02
[52] U.S. Cl. ...................................... 219/161; 219/67; 294/106
[58] Field of Search .................... 219/161, 158, 59.1, 219/67; 228/49 B; 294/99 S, 106; 414/747

[56] References Cited

U.S. PATENT DOCUMENTS

| | | | |
|---|---|---|---|
| 3,166,664 | 1/1965 | Paton et al. | 219/161 X |
| 3,927,424 | 12/1975 | Itoh | 294/106 X |
| 4,023,848 | 5/1977 | Bennett | 294/106 X |

Primary Examiner—Roy N. Envall, Jr.
Assistant Examiner—Catherine M. Sigda
Attorney, Agent, or Firm—Lilling & Greenspan

[57] ABSTRACT

In a resistance welding apparatus of a detachable grip type an improvement consists in that each pipe grip has a bracket (16) whereon two double-arm levers (18), one per side member (3), are pivoted. Similar arms of each lever (18) are interconnected by an extension spring (19), while the other arms are operatively associated with swinging jaws (14) adapted to abut against the pipe surface in their operating position. Each side member (3) is provided with a stop (21) for limiting the movement of the levers (18) relative the corresponding side member (3) in the direction of the action of the extension spring (19).

6 Claims, 5 Drawing Figures

RESISTANCE WELDING APPARATUS FOR JOINING PIPES END TO END

BACKGROUND OF THE INVENTION

1. Field of the Invention

The present invention relates to resistance welding apparatus and particularly to resistance welding apparatus for joining pipes end to end while laying pipe lines. The invention may prove most advantageous in welding pipes under conditions when the joint region is out of easy reach.

2. Description of the Art

Pipes may be joined by a resistance welding process with the aid of the apparatus having either nondetachable or detachable grip mechanisms. The first type of apparatus offers adequate gripping and alignment of the pipes to be welded but such apparatus have the limitation that either the pipeline has to be pulled through the apparatus or the apparatus has to be pulled over the pipeline with a section of the pipeline being prelaid for the apparatus to move on. Also, a prompt transfer of the apparatus for welding any other joint along the pipeline is a problem with such an apparatus.

The limitations just mentioned are obviated in an apparatus having a detachable grip, since such an apparatus may readily be removed from any section of the pipeline and transferred to any other section or for any other purposes, for example maintenance work. Advantages of such apparatus are most apparent when the pipes to be welded are in close proximity to the ground.

Regardless of the above advantages the apparatus with detachable grip mechanisms have other limitations, namely, the gripping jaws are sectionalized so that their effective surface does not come in contact with the pipe surface along the entire perimeter thereof since the required opening of the grip mechanism and the gripping forces are almost always restricted by hydraulic drive capabilities. Such gripping jaws would not provide gripping of the pipes along the perimeter. As a result, despite the fact that the pipe is deformed, it does not resist the gripping force, which causes slippage of the pipe in the gripping jaws during upsetting.

Known in the art is a resistance welding apparatus having a detachable grip mechanism, wherein the pipe to be welded is gripped along the perimeter thereof by additional or swinging jaws (see technical description and service manual for the welding machine K 581 by I, K 581.Б 0.00.00.000.TO). This apparatus comprises two pipe gripping means each including a pair of articulated side members and axially aligned for mutual axial movement, each side member being provided with a gripping jaw, welding transformers electrically connected to the gripping jaws and swinging jaws pivoted to the side members for abutting against the pipe surface in their operating position.

In the prior art apparatus the swinging jaw or jaws are put in their operating position manually, that is why an easy access to that side of the apparatus as well as time are required. To put the swinging jaw in position, when laying horizontal pipelines, it is required either to dig a hole of a sufficient depth or to sufficiently raise the pipes. Known in this particular art are means to mechanically operate the swinging jaws, such as an electromechanical drive, a hydraulic drive. These, however, will make the design more complicated in that apart from the drive mechanisms proper, there will be required controls and power equipment. Due to ample dimensions these mechanisms cannot be a complete solution to the problem set forth hereinbefore as regards laying horizontal pipelines.

SUMMARY OF THE INVENTION

The invention is directed to the provision of a resistance welding machine for joining pipes end to end, wherein movement of the swinging jaws is a function of that of the side members, whereby service conditions, are improved which provides along with an adequate gripping of the pipes for additional applications of the apparatus, for cut-downs in handling time and consequently to a higher performance.

To this end the invention contemplates a resistance welding machine for joining pipes end to end, comprising at least two pipe gripping means each including a pair of articulated side members axially aligned for mutual axial movement, each side member being provided with a gripping jaw, welding transformers electrically connected to the gripping jaws and swinging jaws pivoted to the side members for abutting against the pipe surface in their operating position, wherein, according to the invention, each pipe gripping means has at least one bracket whereon at least one double-arm lever for each side member is pivoted and similar arms of the levers pivoted on one and the same bracket are interconnected by an extension spring, each side member having a related swinging jaw and a stop for limiting the movement of each said lever relative the corresponding side member in the direction of the action of the extension spring, while the other arm of each lever is operatively connected to the corresponding swinging jaw.

In this arrangement the pipes are gripped along their perimeter or circumference and released, following the welding operation, by a mechanical means, this being carried out without an additional drive, since the pipes are gripped and released as herein discussed by means of a drive which is common for the pipe gripping means and the swinging jaws. The bracket, which is fixed against rotation about the axis of rotation of the side members, and the levers pivoted thereon provide for the movement of the swinging jaws as a function of the movement of the side members. Thus, when the pipe gripping means are opened, the swinging jaws are separated so as to let a free passage of the pipe, and then, when the pipe gripping means are closing and the gripping jaws begin closing around the pipe, the motion of the side members towards the pipe surface causes the swinging jaws to move at a faster rate into their operating position than the gripping jaws move.

For the purposes of the present invention the term "operating position" means a position of the swinging jaw when its surface adapted to engage the pipe surface is coincident with an imaginary cylindrical surface forming an extension of the effective surface of the gripping jaw. The swinging jaws having been brought into the operating position, further movement of the side members in the direction of gripping causes the swinging jaws to move towards the pipe surface in that same position as relates to the corresponding side members until contact is established.

Opening of the pipe gripping means and the swinging jaws proceeds in reverse order.

The above-described dependence in the movements of the swinging jaws and the side members made it possible to use mechanical means to effect gripping and releasing of pipes without additional drives. The fact that the swinging jaws are of relatively small dimensions, as will be further shown, makes it possible to grip the pipes which are arranged so close to the ground that additional steps should be conventionally taken to effect the grip, for example ground excavation or raising the pipes for a sufficient height over the ground.

It is advisable that in each swinging jaw be furnished a spring-loaded lock bolt adapted to coincide with its counterpart arranged on the side member when the swinging jaw is in its operating position and to engage its counterpart under the action of the opposite swinging jaw. The arrangement allows all the structural parts of the invention to be made of a lighter weight and adapted to take the force only necessary to move the swinging jaws.

When the pipe is being gripped the spring-loaded lock bolts are being subjected to considerable shearing forces that can cause their jamming preventing return to the initial position when the pipe is being released. To ensure the return of the lock bolts to their initial position it is advisable that spring-loaded ejectors be assembled in the side members substantially axially with the lock bolts.

To ensure that the swinging jaws move into their operating position at a faster rate than the side members as the pipe of a different diameter is being gripped, each stop preferably has a means for adjusting the movement of the levers relative the corresponding side members. This feature is of a paramount importance when small-diameter pipes are to be welded and the swinging jaws are relatively large to be used with them. The most suitable for the aim in view is a screw threadedly extending through the body of the lever for abutment against the stop.

One more aspect of the invention consists in that the operative connection of the levers with the stops to pivot the same levers is made by means of an articulation link. Such a connection in the instant structure has been found the simplest.

BRIEF DESCRIPTION OF DRAWINGS

A preferred embodiment of the invention will now be described, by way of example, with reference to the accompanying drawings, in which:

FIG. 5 is a view of the apparatus of the invention similar to that of FIG. 2, showing the pipe gripping means and the swinging jaws in an open position.

DESCRIPTION OF THE PREFERRED EMBODIMENT

Figure 1:
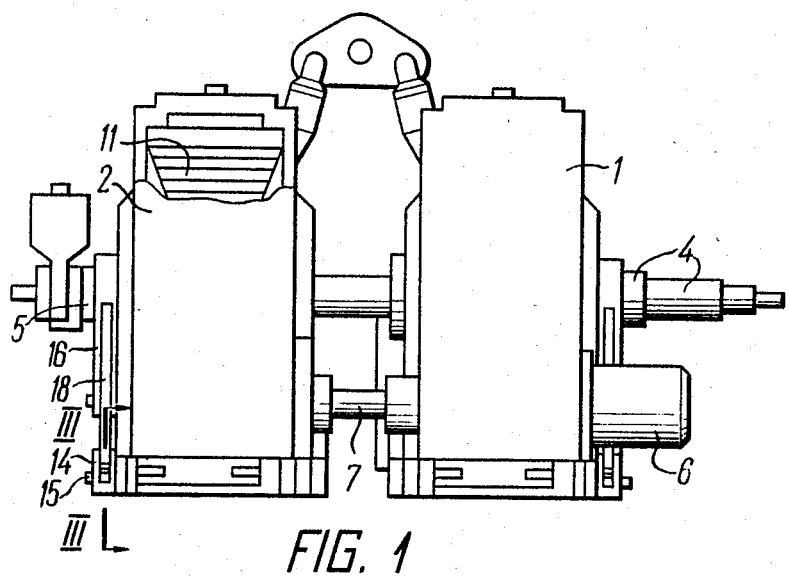
FIG. 1 is an elevation of the apparatus according to the invention.

Referring to FIG. 1, a resistance welding apparatus for joining pipes end to end, comprises two pipe gripping means 1 and 2 each including a pair of articulated side members 3. The side members 3 are arranged on a common axis for mutual axial movement. This is possible due to the pipe gripping means 1 being mounted on an axle 4 and secured against axial movement thereon, while the pipe gripping means 2 is fitted on a sleeve 5 which in turn is mounted for axial movement on the same axle 4. The mutual axial movement of the gripping means 1 and 2 is effected by hydraulic cylinders 6 including piston rods 7 which connect both the gripping means as shown in FIG. 1.

Figure 2:
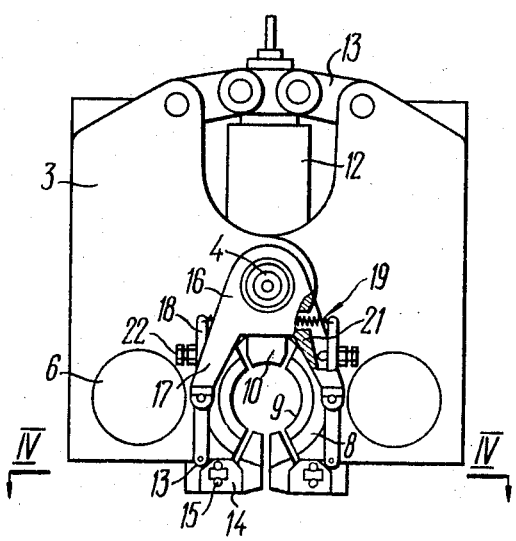
FIG. 2 is an end view of the apparatus according to the invention, wherein a portion of the bracket is broken away.

As can be seen in FIG. 2 each side member 3 is provided with a gripping jaw 8 having a cylindrical effective surface 9 of a radius that is equal to that of the pipe for welding.

The apparatus according to the embodiment illustrated has a support member 10 which supports the machine on the pipe prior to gripping and takes the pipe's reaction after the pipe has been gripped. It is readily understood that a modification without such a support member is equally possible. In this case the gripping jaws 9 have an effective surface of an ample circumferential length to grip the pipe on the upper portion of its circumference.

In the side members 3 for illustration purposes shown only in both the side members of the gripping means 2, are mounted welding transformers 11 electrically connected to the gripping jaws 8 (the electric circuit therefor is not shown as it is conventional). Each gripping means is driven by a hydraulic cylinder 12 through a collapsible lever 13. The apparatus also has a suspension for carrying the same.

Figure 4:
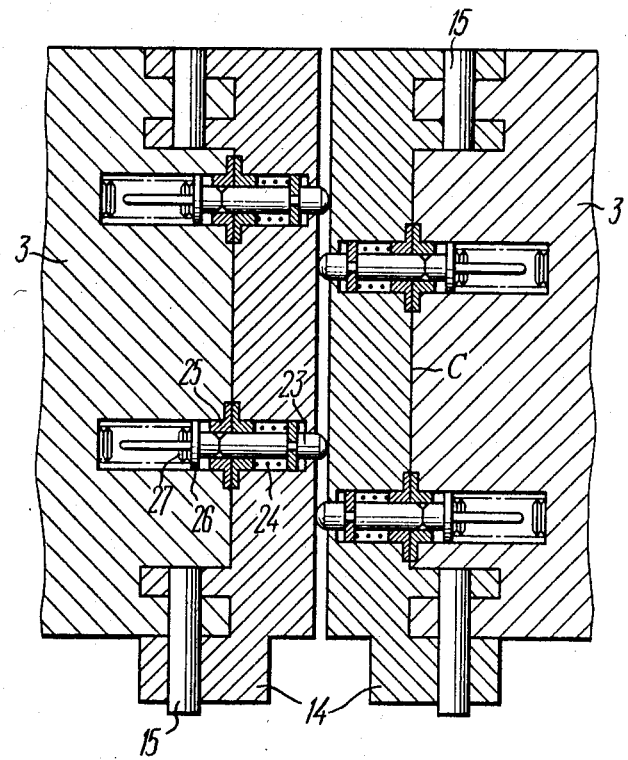
FIG. 4 is a sectional view taken along the line IV—IV of FIG. 2.

Each side member 3 of the pipe gripping means has a stop 14 pivoted to the corresponding side member by means of two pins 15 (FIGS. 2 and 4).

According to the invention each pipe gripping means has a bracket 16 which is fixed against rotation about the axis of rotation of the side members. In the embodiment illustrated the bracket 16 for the gripping means 2 is fit on the sleeve 5 and a similar bracket for the gripping means 1 is on the axle 4. It is to be understood that each gripping means can have two brackets arranged at both sides thereof. Since all the brackets are identical as well as associated structural elements the description of only one bracket shown in more detail in FIG. 2 is given.

Figure 3:
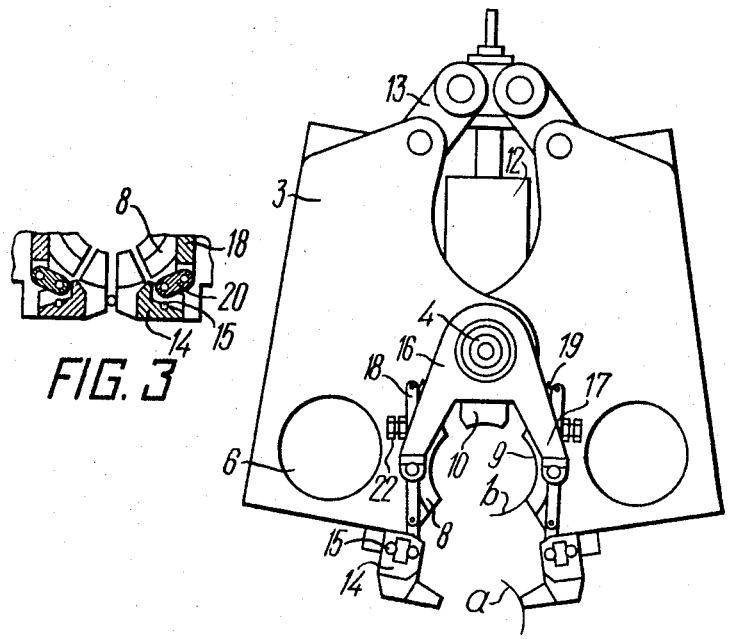
FIG. 3 is a sectional view taken along the line III—III of FIG. 1.

An exemplary bracket identified by the reference numeral 16 is shaped as an inverted U, other shapes being non-exclusive, and on sides facing respective side members of the gripping means there are found portions 17 with double-arm levers pivoted thereto. Similar arms of these levers, namely the upper ones in the drawing, are interconnected by an extension spring 19. The opposite (lower in the drawing) arms of the levers 18 are operatively connected with the corresponding swinging jaws 14. The instant embodiment shows these arms as pivotally connected to the swinging jaws by means of links 20 (FIG. 3). The above operative connection of the levers 18 with the swinging jaws 14 may be established through other means known to the art such as a cam and follower arrangement wherein the lever is a follower and a portion of the swinging jaw surface is a cam. However a connection by means of the articulation link 20 has been found the simplest.

As shown in FIG. 2 each side member 3 in the zone of operation of the levers 18 has a stop 21 for limiting the movement of these levers in the direction of the action of the spring 19. Each stop 21 has a means for adjusting the movement of the levers 18 relative the corresponding side members. According to the present embodiment this means is a screw 22 threadedly extending (thread not shown) through the body of each lever. By adjusting the position of the screw 22 relative the lever the movement of the lever relative the corresponding side member may be adjusted.

Referring to FIG. 4, each swinging jaw 14 comprises lock bolts 23 loaded by a compression spring 24. The lock bolts are arranged so that they coincide with their respective counterparts when the swinging jaws 14 are in their operating position. The counterpart of the lock bolt 23 is an opening in the side member 3 wherein a socket 25 is press-fitted. In the openings of the counterparts for the lock bolts 23 and substantially axially with the latter are ejectors 26 loaded by compression springs such as disk springs 27.

The apparatus of the invention operates as follows.

In the initial position (FIG. 5) under the action of the cylinder 12 through the collapsible lever 13 the gripping means 2 (as well as the means 1) is opened. In this position the levers 18 under the action of the spring 19 and by the screws 22 abut the stops 21. Correlation of the links in the chain "the stop 21—the screw 22, the lever 18, the link 20" is controlling the opening of the swining jaw 14.

After the apparatus has been placed with its support member 10 onto the pipe to be welded, the cylinder 12 actuates the side members 3 for closing, the side members 3 being rotated about their axis of rotation and relative the bracket 16 which is fixed against rotation about this axis. The pin 15 together with the side member 3 follows a path of an arc of a circumference with its centre on the axis of the gripping means. Since the lever 18 under the action of the spring 19 and through the screw 22 abuts the stop 22, and the stop 21 at the point of contact with the screw 22 follows the path of an arc of the circumference with a shorter radius than does the lever 18 the lower arm thereof moves at a slower speed than does the pin 15.

Therefore, a pair consisting of the lever 18 and the link 20 (FIG. 3) collapses and the swinging jaw 14 turns towards the operating position. Due to the correlation of the links in the chain "the stop 21—the screw 22, the lever 18, the link 20", which is adjusted by the screw 22, the swinging jaw 14 is found in the operating position before the gripping jaws taking the gripping position, that is the effective surface a of the swinging jaw 14 coincides with an extension of the effective surface b of the gripping jaw 8. Now the mating surfaces of the swinging jaw 14 and of the side member 3 come in contact on the line c (FIG. 4) and that is why the swinging jaw 14 cannot turn about pins 15.

From this moment the lock bolts 22 are found in register with their counterparts (sockets 25) in the side members 3.

A further motions of the gripping means in the direction of closing and the opposite swinging jaw 14 cause the lock bolt 22 to engage its counterpart in the side member 3 and therefore the ejectors 26 are retracted to load the springs 27.

After the swinging jaws 14 have been moved into their operating position, as hereinbefore described, further movement of the side members 3 until the gripping jaws 8 come in contact with the pipe surface causes the lever 18 to turn about its axis of rotation in the bracket 16. Such movement of the lever 18 is possible due to the side member 3 pulling the lower arm of the lever 18 through the link 20 in the direction of gripping, but since the axis of rotation of the lever 18 is stationary, the upper arm thereof with the screw 22 is driven away from the stop 21 to extend the spring 19. After the gripping jaws 8 and the swinging jaws 14 have come in contact with the pipe, the cylinder 12 effects forced gripping of the pipe. Reaction of the pipe is taken by the lock bolts through the swinging jaws.

The apparatus of the invention effects the resistance welding of the pipes according to a conventional sequence consisting in that the pipes to be welded are heated by a welding current and then upset by means of the upset cylinders 6. Now follows the operation of releasing the pipes.

In releasing the pipes interraction of all the members of the apparatus takes place in reverse order as compared with the above described. It is to note that the swinging jaws 14 move from the operating position into the initial position after the side members 3 have been somewhat opened that is sufficient to an unobstructed get out of the operating position. This comes about as the side member 3 turns in the direction of release, the lever 18 turns about its pivot axis in the bracket 16 and the gap between the screw 22 and the stop 21 is being reduced until completely taken up. The gap being taken up, the lever 18 by its lower arm through the link 20 turns the swinging jaw 14 to take the initial position and further on in the sequence hereinbefore described.

The resistance welding apparatus for joing pipes end to end, wherein the invention is embodied (for practicing the invention) may be utilized for laying main pipe lines as well as for erecting industrial projects and for joining casing pipes on the gas and oil wells.

We claim:

1. A resistance welding apparatus for joining pipes end to end, comprising at least two pipe gripping means each including a pair of articulated side members, said side members being axially aligned for mutual axial movement, each side member being provided with a gripping jaw, welding transformers electrically connected to the gripping jaws and swinging jaws pivoted to the side members for abutment against the pipe surface in their operating position, each pipe gripping means having at least one bracket (16) on which there is pivotally mounted at least one double-arm lever (18) for each side member (3) and similar arms of the levers (18) pivotally mounted on one and the same bracket (16) are interconnected by an exension spring (19), each side member (3) having a related swinging jaw (14) and stop means (21) for limiting the movement of each said lever (18) relative the corresponding side member (3) in the direction of the action of the extension spring (19), the other arm of each lever (18) being operatively connected to the corresponding swinging jaw (14).

2. A resistance welding apparatus as claimed in claim 1, characterized in that each swinging jaw (14) comprises a spring-loaded lock bolt (23) adapted to coincide with a counterpart arranged on the side member (3) when the swinging jaw (14) is in its operating position and to engage its counterpart under the action of the opposite swinging jaw (14).

3. A resistance welding apparatus as claimed in claim 2 characterized in that there are spring-loaded ejectors (26) assembled in the side members (3) substantially axially with the lock bolts (23).

4. A resistance welding apparatus as claimed in claim 1 characterized in that each stop means (21) has a means for adjusting the movement of the levers (18) relative the corresponding side members (3).

5. A resistance welding apparatus as claimed in claim 4 characterized in that the means for adjusting the movement of the levers (18) is a screw (22) threadedly extending through the body of the lever (18) for abutment against the stop means (21).

6. A resistance welding apparatus as claimed in claim 1 characterized in that each lever (18) is pivotally connected to the corresponding swinging jaw (14) by means of a link (20).

* * * * *